United States Patent
Furukawa et al.

(10) Patent No.: US 7,757,279 B2
(45) Date of Patent: Jul. 13, 2010

(54) STORAGE SUBSYSTEM, STORAGE SYSTEM, AND COMMUNICATION CONTROL METHOD

(75) Inventors: Hiroshi Furukawa, Sagamihara (JP); Esutaro Akagawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/181,287

(22) Filed: Jul. 28, 2008

(65) Prior Publication Data

US 2008/0288825 A1    Nov. 20, 2008

(51) Int. Cl.
G06F 12/14 (2006.01)
G06F 17/00 (2006.01)
G06F 13/00 (2006.01)

(52) U.S. Cl. .................. 726/13; 726/23; 711/100; 711/152; 709/224

(58) Field of Classification Search .............. 726/13, 726/23; 711/152, 100; 709/224
See application file for complete search history.

(56) References Cited

U.S. PATENT DOCUMENTS

| | | |
|---|---|---|
| 4,413,328 A | 11/1983 | Videki |
| 4,947,318 A | 8/1990 | Mineo |
| 5,065,429 A | 11/1991 | Lang |
| 5,412,717 A | 5/1995 | Fischer |
| 5,469,564 A | 11/1995 | Junya |
| 5,802,591 A | 9/1998 | Yachida |
| 5,909,700 A | 6/1999 | Bitner et al. |
| 6,263,444 B1 | 7/2001 | Fujita |
| 6,622,220 B2 * | 9/2003 | Yoshida et al. ............... 711/152 |
| 6,728,844 B2 | 4/2004 | Sanada et al. |
| 6,742,094 B2 | 5/2004 | Igari |
| 6,779,083 B2 | 8/2004 | Ito et al. |
| 7,137,145 B2 * | 11/2006 | Gleichauf .................... 726/24 |
| 7,185,266 B2 * | 2/2007 | Blightman et al. .......... 714/776 |
| 2002/0019870 A1 * | 2/2002 | Chirashnya et al. ......... 709/224 |
| 2002/0108059 A1 | 8/2002 | Canion et al. |
| 2003/0159058 A1 | 8/2003 | Eguchi et al. |
| 2004/0009336 A1 | 1/2004 | Marcadal et al. |

(Continued)

FOREIGN PATENT DOCUMENTS

EP    1-117-028 A2    7/2001

(Continued)

OTHER PUBLICATIONS

Japan Patent Office (JPO) office action dated Nov. 20, 2007 for JPO laid open patent application JP2003-389475.

*Primary Examiner*—Kambiz Zand
*Assistant Examiner*—William S Powers
(74) *Attorney, Agent, or Firm*—Townsend and Townsend and Crew LLP

(57) ABSTRACT

In a storage subsystem which is connected to an IP network, by excluding an improper packet, security is heightened, and a performance of communication to a logical unit of storage subsystem is maintained and secured. In the storage subsystem, a function which carries out filtering of a packet other than an iSCSI packet is provided. With respect to only the packet passed through the function, its accessibility to the logical unit is filtered. Also, traffic of all received packets, and a traffic lob of a packet judged to be discarded by the above filtering is recorded. By using this information, controlling such as a cut-off process of improper communication, QoS securement for normal communication and so on, are carried out.

8 Claims, 8 Drawing Sheets

U.S. PATENT DOCUMENTS

2004/0153749 A1* 8/2004 Schwarm et al. .............. 714/11

FOREIGN PATENT DOCUMENTS

| | | |
|---|---|---|
| EP | 1363174 A1 | 11/2003 |
| JP | 10-313341 A | 11/1998 |
| JP | 2001-265655 | 9/2001 |
| JP | 2002-169716 A | 6/2002 |
| JP | 2003-304293 A | 10/2003 |

* cited by examiner

FIG.3

| iSCSI NAME | VIRTUAL LUN | LUN |
|---|---|---|
| Iqn .2003-07.com.XXX  :iscsi-disk :mdel-YYY :sn-ZZZ | 0,1,2,3,4 | 0,1,6,8,15 |
| Iqn .2003-07.com.RRR  :iscsi-disk :mdel-SSS :sn-TTT | 0,1,2 | 2,7,10 |
| Iqn .2003-07.com.OOO  :iscsi-disk :mdel-PPP :sn-QQQ | 0,1,2,3 | 3,4,5,14 |
| ⋮ | ⋮ | ⋮ |

| JUDGING OBJECT COMMUNICATION RATIO | THRESHOLD |
|---|---|
| NON-iSCSI PACKET TRAFFIC (/s)/ALL TRAFFIC (/s) | 50% OR MORE |
| UNPERMITTED iSCSI PACKET TRAFFIC (/s) / iSCSI PACKET ALL TRAFFIC (/s) | 30% OR MORE |
| PERMITTED iSCSI PACKET TRAFFIC (/s) / ALL TRAFFIC (/s) | 60% OR LESS |
| ⋮ | ⋮ |

122a, 122b / 1221, 1222, 1223 / 122

STORAGE SUBSYSTEM, STORAGE SYSTEM, AND COMMUNICATION CONTROL METHOD

CROSS-REFERENCES TO RELATED APPLICATIONS

The present application claims priority to U.S. patent application Ser. No. 10/791,452, filed on Mar. 1, 2004, which claims priority to Japanese Patent Application No. 2003-389475, filed Nov. 19, 2003 and is incorporated by reference in its entirety.

BACKGROUND OF THE INVENTION

The present invention relates to communication between a host computer and a storage subsystem. In particular, it relates to a filtering technology and a communication cut off technology in communication at the time of an access from the host computer to a logical unit in the storage subsystem.

In a storage system in which one or more host computers and one or more storage subsystems were connected by a network, there is a security technology which prevents an unauthorized access on the occasion of accessing from a host computer to a logical unit LU (Logical Unit) in a storage subsystem.

As an example, in an environment where an accessible logical unit is restricted with respect to each host computer, cut off of a unauthorized access is realized by having a filtering function in a storage subsystem, which judges right and wrong of an access of received information by information regarding a host computer as a source.

For example, a storage system which is disclosed in Japanese Patent Laid-Open Publication No. 2000-265655 (hereinafter, referred to as Patent Document 1) comprises, on a nonvolatile memory in a storage subsystem, in addition to a LUN access management table which manages a WWN (World Wide Name) as information which uniquely identifies a host computer, a LUN (logical Unit Number) as a number of a logical unit in a storage subsystem which permitted an access from the host computer, and a virtual LUN as a number of a virtual LU that a user or an operating system on the host computer arbitrarily assigned in parallel with the LUN, by associating them one another. In such communication that the host computer accesses to the storage subsystem, the storage system further comprises a WWN-S-ID management table which manages a S-ID (Source ID) as a management number which is dynamically assigned at the time of log-in and which is always constant during the host computer is in operation, and the WWN of the host computer, by associating them each other.

In the storage system disclosed in Patent Document 1, with reference to these two management tables, right and wrong of an access to a logical unit is judged at the time point of generation of an inquiry command at the time of log-in. After that, there is no necessity to repeat this judgment. On this account, it is possible to limit right and wrong of an access with each of a logical unit, over maintaining and operating a storage subsystem with high performance, which realizes strong security.

In this regard, however, the storage system disclosed in Patent Document 1 is a system which was built up by a dedicated network, such as a SAN (Storage Area Network) in which a host computer and a storage subsystem are connected to be networked by using a dedicated interface called as Fiber Channel (FC). Therefore, it is a premise that only a SCSI command, which is a command set for an access from a host computer to a storage subsystem, is transmitted to a storage subsystem.

On the other hand, in these years, a standard specification of iSCSI, which is a protocol for transmitting and receiving a SCSI command on an IP network, has been studied by a standards body, IETF.

In an iSCSI, transmission and reception of a command are carried out, by storing (encapsulating) an SCSI command etc. in a transfer frame of a TCP packet which is stored in a payload of an IP packet and by streaming it on an IP network, which realizes an I/O process between a host computer and a storage subsystem.

By using an iSCSI, it is possible to connect not only a host computer but also a storage subsystem directly to an IP network. A hub, a router, a switch type etc. which have been used in an IP network conventionally and configure a network can be used without change.

Therefore, by using an IP network, it is possible to easily respond to widening of a storage subsystem access which was difficult to be realized from such technical aspects as cost aspect and communication distance limit. It is also possible to apply a matured IP network management technology without change, so that simplification of management can be expected.

SUMMARY OF THE INVENTION

However, in the above-described iSCSI, there are merits as described above, but on the other hand, demerits exist.

On an IP network, a variety of communication packets are transmitted and received. On this account, as compared with a conventional case in which a host computer and a storage subsystem are connected by an FC network as a dedicated network, there is such an aspect that it is not possible to foresee a traffic communication performance and so on.

Also, since all the world is surrounded by an IP network, there is a possibility that an ill-willed user goes on a communication attack on a storage subsystem etc. connected to an IP network for the purpose of system-down, falsification of data, theft and so on, and it has weakness in a security aspect.

A filtering function disclosed in Patent Document 1 lets through only a packet which is permitted to access to any logical unit in a storage subsystem. On this account, a packet which is not basically permitted to access does not reach to a logical unit.

However, as described above, the filtering function of Patent Document 1 is predicated on such a network that there exists only a packet for an access to a storage subsystem, and it is not a structure with awareness of such an environment that an unexpected packet is transmitted as in an IP network.

Also, in the technology disclosed in Patent Document 1, a packet judged to be not permitted to access (hereinafter, referred to as improper packet) is not processed and simply discarded.

For example, as an improper packet, it can be a packet from a host computer which is not permitted to access to that storage subsystem, an unexpected packet from an unknown device which is not primarily permitted to access to a storage subsystem itself, and so on. However, in the technology disclosed in Patent Document 1, it is not possible to determine even a type and a source of these improper packets.

In an environment which is connected to such a communication line that a packet other than a packet for an access to a storage subsystem in an IP network etc. is transmitted and received, there is a high possibility that, particularly in packet from an unknown device, an ill-willed packet which is intended for a communication attack is included. However, in the technology disclosed in Patent Document 1, a positive defensive measure to such communication attack is not considered.

The present invention is made of taking such situation into consideration. It is an object to heighten security, in a storage subsystem which is connected to a communication line, and to secure a network QoS to a storage subsystem.

In order to achieve the above-described object, a storage subsystem of the present invention comprises filtering means which has only a proper packet passed through to a logical unit of a storage subsystem, out of packets received from a network at the time of session establishment. On that occasion, header information etc. of a packet to be discarded is alerted to a management server. The management server received the alert controls communication on a network, by utilizing the header information etc.

For example, the present invention provides a storage subsystem which is connected to a host computer through a communication line, comprising an interface used for connecting to the communication line, and wherein, the interface comprises a first filtering means which judges whether a packet, out of the communication packets, is a communication packet with a predetermined format for use in an access to the storage subsystem or not, when the communication packet is received from the communication line.

Also, the storage subsystem comprises a communication failure judging means which measures traffic of all communication packets received in the interface, and traffic of communication packets judged to be no communication packet of the above-described format in the first filtering means, respectively, and which judges whether a communication failure is generated or not, by using both traffic. The storage subsystem further comprises a communication failure alerting means which alerts a management server connected to the storage subsystem and comprises a function for displaying alerted information, in case that it is judged that a communication failure is generated. The management server comprises source searching means which refers to a traffic log, and searches a source of the communication packet which has the communication failure generated, in case that it was alerted from the communication failure alerting means that the communication failure is generated, and relay device control means which controls a relay device which relays communication to a storage subsystem disposed on the communication line so as to cut off communication from the source, based on the information of the source searched by the source searching means.

According to the present invention, it is possible to heighten security in a storage subsystem connected to a communication line. Further, it is possible to secure a network QoS to a storage subsystem.

BRIEF DESCRIPTION OF THE INVENTION

FIG. 3 is a view for illustrating an LU access permission table of an embodiment of the present invention.

FIG. 4 is a view for illustrating a communication failure judging threshold table of an embodiment of the present invention.

DESCRIPTION OF THE PREFERRED EMBODIMENTS

Hereinafter, one embodiment of the present invention will be described by using the drawings.

In an embodiment of the present invention, a case using iSCSI for communication between a storage subsystem and a host computer, in a storage system having one or more host computers and one or more storage subsystems, will be described as an example. That is, in this embodiment, as a protocol which is used between both of them, a protocol of a network layer is an IP (Internet Protocol), and a protocol of a transport layer is a TCP/IP which is a TCP (Transmission Control Protocol), and as a command set which carries out control of a storage subsystem, an SCSI command is used. The SCSI command is encapsulated in a packet which is exchanged on the TCP/IP, and then, transmitted and received.

As a matter of course, the present invention is not limited to the above-described protocols and command set. If the configuration is that the command set for accessing a storage subsystem from a host computer is implemented on a protocol used in a network, the format of the protocol and the command set are not asked.

Figure 1:
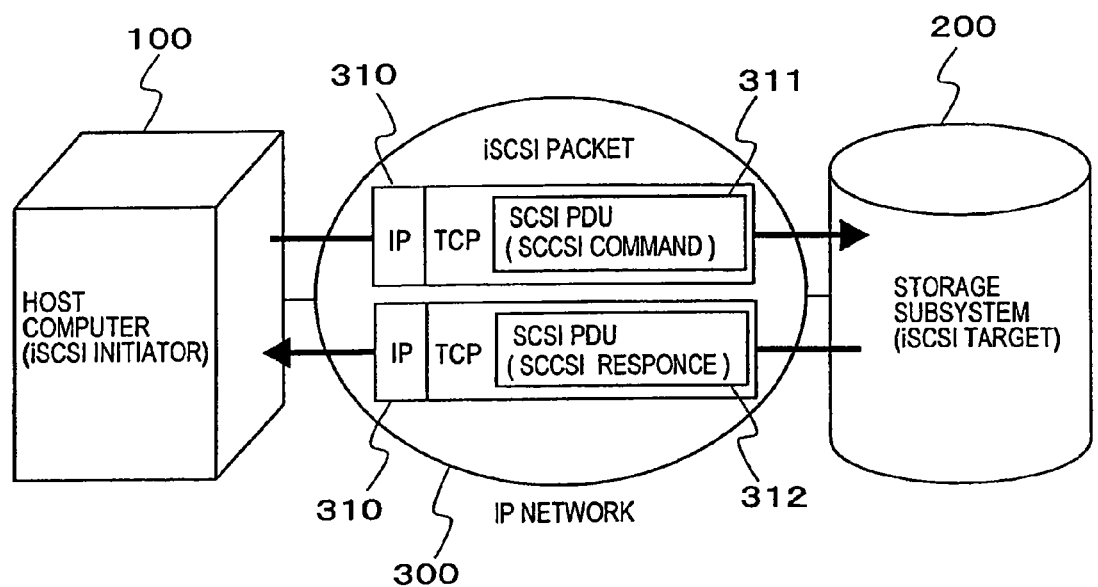
FIG. 1 is a view for illustrating an iSCSI packet of an embodiment of the present invention.

FIG. 1 shows a configuration of the iSCSI and basic concept of a packet which is transmitted and received, which are the premise of the present invention. In this figure, 100 designates a storage subsystem, 200 designates a host computer, and 300 designates an IP network which connects between the storage subsystem 100 and the host computer 200. Also, in this embodiment, out of IP packets transmitted and received on the IP network, an IP packet which stored an SCSI command, an SCSI response etc. in a TCP packet stored in a payload of an IP packet, is referred to as iSCSI packet 310.

In an iSCSI protocol, a source of an SCSI command 311 is referred to as iSCSI initiator, and a side which processes a received command and returns a response 312 to the SCSI command 311 is referred to as iSCSI target. Therefore, in this figure, the host computer 200 is the iSCSI initiator, and the storage subsystem 100 is the iSCSI target.

In a hierarchical model of iSCSI, an iSCSI layer is located between an SCSI layer and a TCP/IP layer which exchange the SCSI command. The iSCSI layer receives the SCSI command etc. from the SCSI layer, encapsulates it to prepare an SCSI PDU (Protocol Data Unit), and transfers it to the TCP/IP layer. Also, it processes an iSCSI PDU received from the TCP/IP layer, pulls out the SCSI command etc., and transfers it to the SCSI layer.

A communication data configuration of a part below the TCP/IP layer of the iSCSI packet 310 is the same as a commonly used TCP/IP packet configuration. The iSCSI packet 310 is transmitted and received as a normal TCP/IP packet on the IP network 300, until it processes the encapsulated SCSI command.

In addition, a header of the iSCSI packet 310 includes information which shows that the iSCSI command is encapsulated in the packet. On this account, at the side of the iSCSI target received the iSCSI packet, it is possible to judge whether the packet is the iSCSI packet 310, by confirming header information, without carrying out a process for pulling out the iSCSI command in the TCP/IP layer.

Also, in case of iSCSI, in the iSCSI layer, a session as a logical communication path is built up between the iSCSI initiator 200 and the iSCSI target 100, and then, communication is carried out. The session is built up after authentication is obtained, in the same manner as a commonly used procedure of building up a connection in a TCP layer. A procedure for obtaining authentication is referred to as iSCSI log-in in iSCSI. In this embodiment, before a session is built up, i.e., prior to the iSCSI log-in, each of all IP packets is filtered as to whether it is the iSCSI packet or not, and if it is the iSCSI packet, a session is built up. After the session is built up, filtering of packets is not carried out, relying on that authentication.

In addition, these methods of building up a session and of log-in are the same specification as one between the storage subsystem 100 and the host computer 200 connected by a conventional FC network (see, Patent Document 1). Therefore, when viewed from the SCSI layer, there is no difference due to a type of a subordinate hierarchy, i.e., a type of a network by using TCP/IP and FC.

Also, in Patent Document 1, in order to uniquely specify the host computer 200, data conversion which specifies a WWN from a S-ID of an FC frame header is carried out. In iSCSI, in order to specify the host computer 200 at the time of building up a session, an iSCSI name as a domain concept utilized conventionally in the IP network 300 is used. The iSCSI name is included in header information of the iSCSI packet.

From the foregoing, in a network connection of the storage subsystem 100 and the host computer 200 by using iSCSI means, what was configured in an FC network so far is simply replaced by the IP network 300, and there is no difference at all in an access specification to a storage subsystem.

Figure 2:
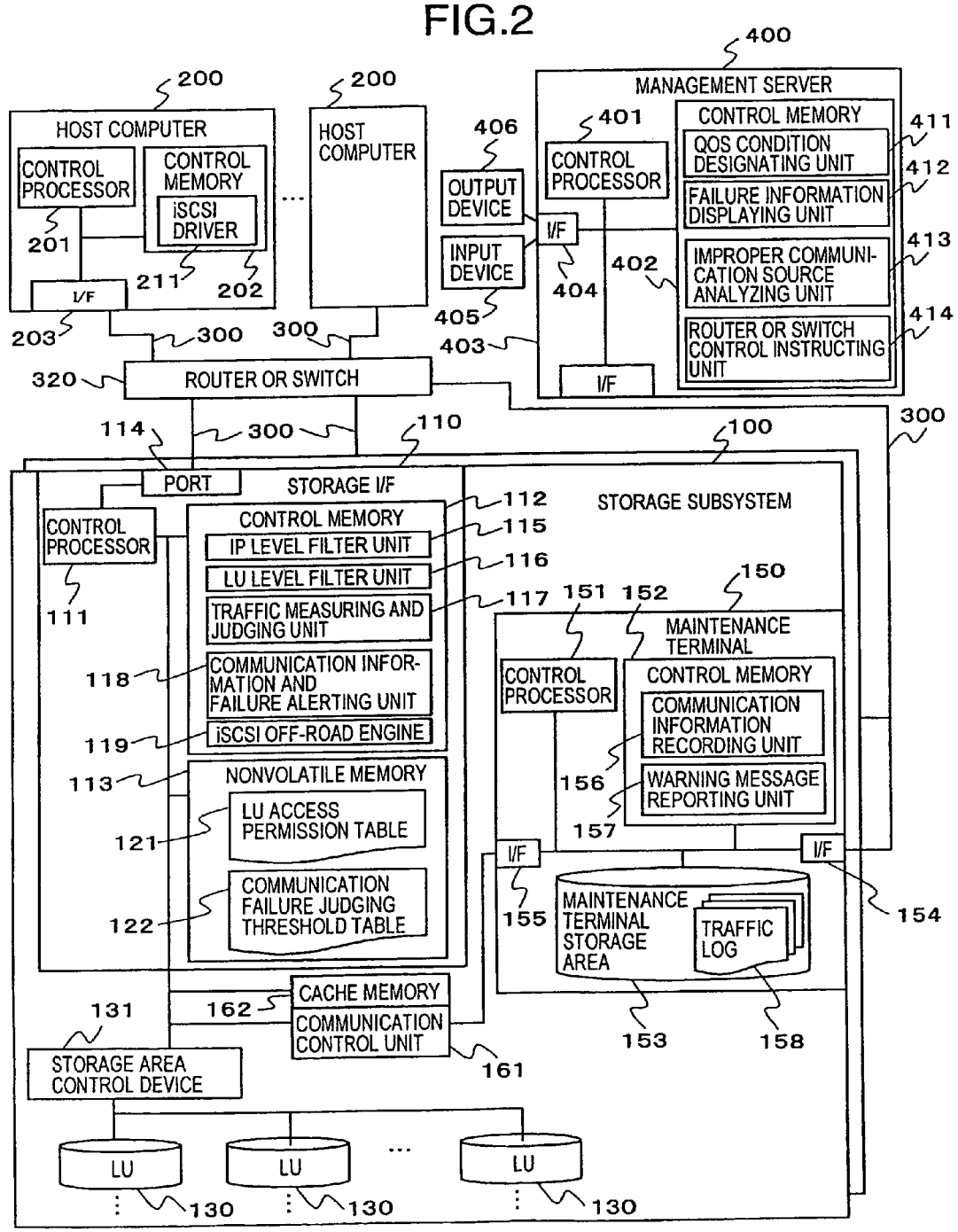
FIG. 2 is a functional configuration view of a storage system of an embodiment of the present invention.

Next, a storage system of the embodiment of the present invention will be described. FIG. 2 is a functional configuration view of the storage system of this embodiment.

As shown in this figure, the storage system of this embodiment has one or more host computers 200, one or more storage subsystems 100, a management server 400, and the IP network 300.

The IP network 300 is a network which utilizes a TCP/IP as a communication protocol, and all the world is at present surrounded by that, as represented by Internet, and it is a network environment to which various information devices are connected. The storage subsystem 100, the host computer 200 and the management server 400 are connected by this IP network 300. The iSCSI packet is exchanged through the IP network 300, in the same manner as other IP packets.

Here, in this embodiment, as the IP network 300, a configuration which is connected as a star arrangement by a router or switch 320 will be described as an example. However, a network configuration is not limited to this. It is fine if a router or switch 320 is located between the storage subsystem 100 and the host computer 200.

The storage subsystem 100 comprises a storage interface 110 which receives IP packets from outside of the storage subsystem 100, a logical unit (LU) 130 as a storage area, a storage area control device 131 which receives an I/O instruction to control the logical unit 130, a maintenance terminal 150 which maintains the storage subsystem 100, a communication control unit 161 which communicates information at the side of the storage subsystem 100 to the maintenance terminal 150, and a cache memory 162 which realizes speeding up an I/O process etc.

Here, the storage interface 110 comprises, as a hardware configuration, a control processor 111 which controls entire operations, a control memory 112 which stores a program that the control processor 111 executes, a nonvolatile memory 113 which stores data even when the control processor 111 is stopped, and a port 114 which is an I/F with an external network.

The control processor 111 realizes each function of an IP level filter unit 115, an LU level filter unit 116, a traffic measuring and judging unit 117, communication information and failure alerting unit 118, and an iSCSI off-road engine 119, by executing the program stored in the control memory 112.

The nonvolatile memory 113 stores an LU access permission table 121 used when the above-described program is executed, and a communication failure judging threshold table 122.

The IP level filter unit 115 filters IP packets before a session is built up. Concretely, the IP level filter unit 115 refers to header information of all IP packets received at the port 114 before a session is built up, depending upon whether information which shows that it is the iSCSI packet is stored or not, and judges whether the IP packet is the iSCSI packet or not.

In case that the IP packet is judged to be the iSCSI packet, it is sent out to the LU level filter unit 116, and in case that the IP packet is another IP packet (hereinafter, referred to as non-iSCSI packet) is sent out to the communication information and failure alerting unit 118 through the traffic measuring and judging unit 117.

The LU level filter unit 116 filters the received iSCSI packet. Concretely, the LU level filter unit 116 judges whether the received iSCSI packet is accessible to the logical unit 130 or not with reference to the LU access permission table 121 which will be described later, based on an iSCSI name of an iSCSI packet received at the time of iSCSI log-in. In addition, after that, during the log-in is valid, check of accessibility of the iSCSI packet having the iSCSI name to the logical unit 130 is not carried out.

The accessible iSCSI packet (hereinafter, referred to as permitted iSCSI packet) is sent out to the iSCSI off-road engine 119 through the traffic measuring and judging unit 117. An iSCSI packet which does not have access permission (hereinafter, referred to as unpermitted iSCSI packet) is sent out to the communication information and failure alerting unit 118 through the traffic measuring and judging unit 117.

Here, the LU access permission table 121 will be described. The LU access permission table 121 stores the logical units 130 permitted to access, by associating with each host computer. FIG. 3 shows one example of the LU access permission table 121.

As shown in this figure, the LU access permission table 121 has an iSCSI name 1211 which uniquely specifies the host computer 200, a virtual logical unit number (virtual LUN) 1212 that a user and an operating system on the host computer 200 arbitrarily assigned to the logical unit 130, and a logical unit number (LUN) 1213 which uniquely specifies the logical unit 130 on the storage subsystem 100 corresponding to the virtual LUN 1212. This LU access permission table 121 is set up in advance by an administrator etc. from the management server 400 etc.

If the same iSCSI name as the iSCSI name stored in a header of the iSCSI packet that the LU level filter unit 116 received, is stored in the iSCSI name 1211 of the LU access permission table 121, and the virtual LUN 1212 and the LUN

1213 which correspond to that are stored, it means that an access is permitted. In addition, since a method of judging accessibility in the LU level filter unit 116 is the same as the method of Patent Document 1, its explanation will be omitted here.

The traffic measuring and judging unit 117 receives three types of packets (permitted iSCSI packet, unpermitted iSCSI packet, non-iSCSI packet) classified by two filtering means of the IP level filter unit 115 and the LU level filter unit 116, and measures each traffic per unit of time, respectively. After that, in accordance with a type of the received packet, the traffic measuring and judging unit 117 sends it out to the communication information and failure alerting unit 118, or the iSCSI off-road engine 119. Also, by using a measurement result per unit of time, in accordance with the communication failure judging threshold table 122, presence and absence of the communication failure generation are judged.

Here, the communication failure judging threshold table 122 is a table in which the thresholds and criteria of judgment are stored with respect to each judging object. FIG. 4 shows one example of the communication failure judging threshold table 122.

The communication failure judging threshold table 122 of this embodiment has a judging object communication ratio storing column 122a which stores a content of a judging object communication ratio, and a threshold storing column 122b which stores criteria of judgment as well as thresholds by which it is judged to be a communication failure.

In this embodiment, as the judging object communication ratio, for example, a ratio 1221 that traffic of the non-iSCCI packet per unit of time takes up to traffic of all packets received in the storage interface 110 per unit of time (hereinafter, referred to as non-iSCSI packet ratio), a ratio 1222 that traffic of the unpermitted iSCSI packet per unit of time takes up to traffic of all iSCSI packets classified in the IP level filter unit 115 per unit of time (hereinafter, referred to as unpermitted iSCSI packet ratio), and a ratio 1223 that traffic of the permitted iSCSI packet per unit of time takes up to traffic of all packets received in the storage interface 110 per unit of time (hereinafter, referred to as permitted iSCSI packet ratio), and so on.

In addition, the examples of the communication failure to be judged from respective ratios are following. In case from the non-iSCSI packet ratio, the communication failure is cased by a communication attack of an improper packet. In case from the unpermitted iSCSI packet ratio, the communication failure is cased by that the host computer 200 which fell in such a state that it does not already have a right of an access to the storage subsystem 100, continues to access without change, for any reason. And in case from the permitted iSCSI packet ratio, the communication failure is cased by that a network QoS is not appropriate. In the threshold storing column 122b, stored are values and criteria by which it is possible to judge generations of these communication failures.

In this embodiment, the traffic measuring and judging unit 117 judges as a communication failure, in case that a value of a communication ratio which is obtained from respective measurement results satisfies conditions stored in the threshold storing column 122b, and alerts the communication information and failure alerting unit 118, that the communication failure is generated, a type of a communication ratio by which it is judged that the communication failure is generated (failure type:non-iSCSI packet ratio, the unpermitted packet ratio, or the permitted iSCSI packet ratio etc.), a value of a communication ratio when it is judged that the communication failure is generated, time information (failure time) per unit of time when traffic is measured, by which it is judged that the communication failure is generated, and communication information of a packet when it is judged that the communication failure is generated. Here, the communication information to be notified will be described in a traffic log 158 which will be described later.

For example, when traffic of all packets is 150 KByte/s, if traffic of the non-iSCSI packet is 100 KByte/s, a value of the non-iSCSI packet ratio 1221 of the communication failure judging threshold table 122 becomes 66%, and corresponds to "50% and more" which is stored in the threshold storing unit 122b. In the suchlike case, the traffic measuring and judging unit 117 judges that communication with such level that a problem occurs in normal communication of iSCSI packet reaches to the storage subsystem 100, i.e., that failure is generated.

In addition, the judging object communication ratio shown in this figure is one example, and it is possible to use, as a judging object, various communication ratios obtained by using arbitrary traffic measured from information regarding three packets classified by the two filtering means of the IP level filter unit 115 and the LU level filter unit 116.

The communication information and failure alerting unit 118 transmits, to the maintenance terminal 150, packets received from the two filter units of the IP level filter unit 115 and the LU level filter unit 116 through the traffic measuring and judging unit 117, and information received in case that it is judged as a communication failure in the traffic measuring and judging unit 117.

The iSCSI off-road engine 119 applies processing as the iSCSI target, to the permitted iSCSI packets received through the IP level filter unit 115 and the LU level filter unit 116, pulls out the SCSI command, and transmits it to the logical unit 130 designated as a destination of transmission.

In addition, a program realizes the above-described function may be stored in a recording medium (flexible disk, CD-ROM, DVD-ROM, semiconductor memory, transmission path such as LAN and SAN etc., and so on) which can be read by the control processor 111, but not in the control memory 112. Also, the function of the program may be realized by a hardware configuration (semiconductor integrated circuit such as LSI (large Scale Integration) etc.).

The maintenance terminal 150 comprises, as a hardware configuration, a control processor 151 which controls entire operations of the maintenance terminal 150, a control memory 152 which stores a program that the control processor 151 executes, a maintenance terminal storage area 153 which stores and keeps data, an interface 154 with an external network, and an interface 155 with a main body of the storage subsystem 100.

The control processor 151 realizes each function of a communication information recording unit 156 and a warning message reporting unit 157, by executing the program stored in the control memory 152.

In the maintenance terminal storage area 153, a traffic log 158 is recorded and saved.

The communication information recording unit 156 records communication information of a packet sent from the communication information and failure alerting unit 118, in the maintenance terminal storage area 153, as the traffic log 158.

Figure 5:
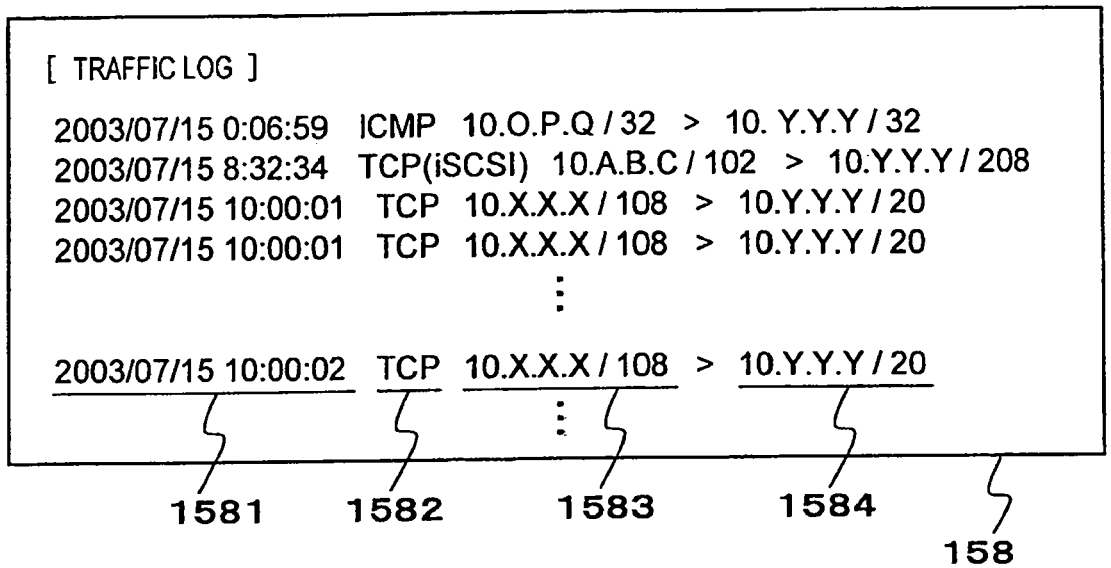
FIG. 5 is a view for illustrating a traffic log of an embodiment of the present invention.

Here, information recorded in the traffic log 158 will be described. FIG. 5 shows one example of the traffic log 158 in this embodiment.

Communication information of a packet to be recorded is, for example, as shown in this figure, a date 1581 when the communication information is recorded, a type 1582 of a protocol of a packet of the above-mentioned communication, an IP address and a use port number 1583 of a source of transmission, an IP address and a use port number 1584 of a destination of transmission, and so on.

In addition, the traffic log shown here is one example, and if the following information is included above described information at minimum, presence and absence of its recording format, and other information are not asked.

The warning message reporting unit 157 generates a warning message, by using an alert that a communication failure is generated, sent from the communication information and failure alerting unit 118, a failure type, a value of a communication ratio, and information of failure time, by combining with a text message prepared in advance with respect to each failure type, and reports it to the management server 400.

In addition, a program which realizes these functions may be stored in a recording medium which can be read by the control processor 151 (flexible disk, CR-ROM, DVD-ROM, semiconductor memory, transmission path such as LAN and SAN etc., and so on).

Also, the function of the program may be realized by a hardware configuration (semiconductor integrated circuit such as LSI (large Scale Integration) etc.).

In this embodiment, a configuration which contains the maintenance terminal 150 in the storage subsystem 100 will be described as an example, but a configuration of the maintenance terminal 150 is not limited to this. For example, it may be a configuration which is provided outside the storage subsystem 100. Also, it may be configured that maintenance terminal 150 is provided for a plurality of storage subsystems 100.

The host computer 200 comprises, as a hardware configuration, a control processor 201 which controls entire operations, a control memory 202 which stores a program that the control processor 201 executes, and an interface 203 with an external network.

The host computer 200 comprises an iSCSI driver 211 which generates an iSCSI packet, by storing an SCSI command in a frame, on the control memory 202.

In addition, the iSCSI driver 211 is a program whose function is realized by being executed by the control processor 201. Also, this program may be stored in a recording medium which can be read by the control processor 201 (flexible disk, CR-ROM, DVD-ROM, semiconductor memory, transmission path such as LAN and SAN etc., and soon). Also, the function of the program may be realized by a hardware configuration (semiconductor integrated circuit such as LSI (large Scale Integration) etc.).

The management server 400 comprises, as a hardware configuration, a control processor 401 which controls entire operations, a control memory 402 which stores a program that the control processor 401 executes, an interface 403 with an external network, an I/F 404 with an input/output device, an input device 405, and an output device 406.

The control processor 401 realizes each function of a QoS condition designating unit 411, a failure information displaying unit 412, an improper communication source analyzing unit 413, a router or switch control instructing unit 414, by executing the program stored in the control memory 402.

The failure information displaying unit 412 displays information indicated by the warning message on the output device 406, when the warning message is sent from the storage subsystem 100 to the management server 400.

The QoS condition designating unit 411 receives information of a network QoS which is desired to be secured on the IP network when the warning message is sent from the storage subsystem 100, from an administrator through the input device 405, and sets it up. A set up timing is determined by an administrator according to need, after building of a system is completed. For example, it is right after the building, or such a case that an administrator who sees a content of the warning message displayed on the output device 406, judges that resetting is necessary, and so on.

Furthermore, when the warning message is received, in case that the failure type which shows the permitted iSCSI packet ratio 1223, the QoS condition designating unit 411 accesses to the communication failure judging threshold table 122, compares a value of a communication ratio in the warning message with contemporary threshold and criteria of judgment of a corresponding communication ratio, which are set up in the threshold storing column 122*b*, and judges whether it is necessary to readjust a network QoS or not.

A concrete example of judgment will be described as follows. For example, it is assumed that the router or switch 320 is set up so as to control to secure 70% of all traffic for use in the iSCSI packet, with an error of less than 10%, in a QoS used for an access to the logical unit 130 of the storage subsystem 100. In this case, in the communication failure judging threshold table 122, as shown in FIG. 4, 60% or less is set up as threshold and criteria of judgment which judge whether it exceeded a normal scope of control or not. In case that the permitted iSCSI packet ratio dropped down to 60% or less, at the time of the suchlike setup, i.e., in case that QoS control is not carried out as set up by the router or switch 320, it is judged as failure generation by the traffic measuring and judging unit 117, and thereby, that status is detected, and it is alerted to the management server 400 through the warning message reporting unit 157.

Normally, in case of having matched with criteria of judgment which are stored in the threshold storing column 122*b* of the communication failure judging threshold table 122, a warning message is issued. Therefore, readjustment is required. However, there may be such a case that the thresholds and criteria of judgment of the communication failure judging threshold table 122 have been changed from a value etc. at the time when the warning message is generated. On this account, judgment is carried out once in the Qos condition designating unit 411.

And, in case that a result of the judgment which requires readjustment, i.e., it matches with the criteria of judgment which are set up in the communication failure judging threshold table 122, a control instruction for adjusting a QoS is issued to the router or switch control instructing unit 414 which will be described later.

Here, the control instruction is, for example, to changes a configuration of the router or switch for a throughput of the permitted iSCSI packet to come close to a QoS to be targeted. For example, it is to change a parameter value to lengthen queuing wait time in the router or switch.

The improper communication source analyzing unit 413 accesses to the traffic log 158 recorded in the storage area 153 of the maintenance terminal, based on information at the failure time in the warning message, when the warning message is sent from the storage subsystem 100 to the management server 400, and analyzes a source of improper communication considered as such a communication attack that a large amount of the non-iSCSI packets are transmitted.

A concrete example of analysis will be hereinafter described. For example, it is assumed that the above-described traffic measuring and judging unit 117 measures traffic of one second from 10:00:01 to 10:00:02, Jul. 15, 2003 as unit of time, based on a group of the traffic logs 158 shown in FIG. 5, and judges that failure is generated, since it exceeds a threshold. Here, in case of the traffic log shown in FIG. 5, during a period from 10:00:01 to 10:00:02, Jul. 15, 2003, a large amount of the non-iSCSI packets are arrived from the same source.

In this case, in the warning message, as the failure time, 10:00:01, Jul. 15, 2003 is stored. The improper communication source analyzing unit 413 searches the traffic log 158 corresponding to the failure time in this warning message.

Out of that, the non-iSCSI packet is searched, and with respect to each source of transmission, traffic is obtained. And, address information 1583 of a source of transmission is searched, which exceeded predetermined traffic, and so on.

A control instruction which instructs to cut off communication from a source of the improper communication is issued to the router or switch control instructing unit 414 which will be described later.

The router or switch control instructing unit 414, when a warning message is sent from the storage subsystem 100 to the management server 400, in accordance with a control instruction issued from the QoS condition designating unit 411 and the improper communication source analyzing unit 413, controls the router or switch 300, cuts off a packet from a source of the improper communication, and secures a QoS of a packet of a normal access.

In addition, a program which realizes these functions may be stored in a recording medium which can be read by the control processor 401 (flexible disk, CR-ROM, DVD-ROM, semiconductor memory, transmission path such as LAN and SAN etc., and so on).

Also, the function of the program may be realized by a hardware configuration (semiconductor integrated circuit such as LSI (large Scale Integration) etc.).

Figure 6:
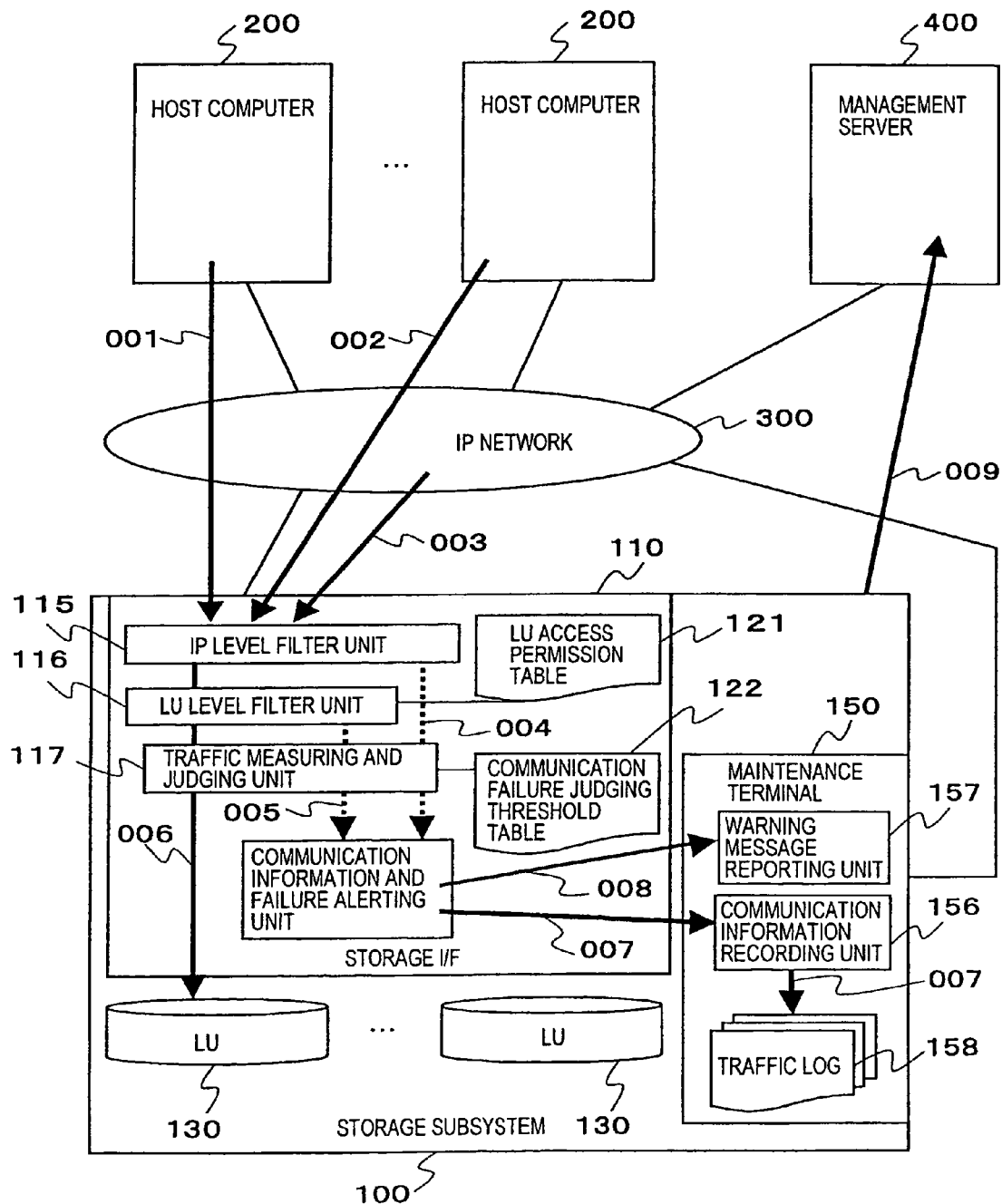
FIG. 6 is a view for illustrating a flow of processes when a storage subsystem received a packet.

Next, an outline of a process flow in case that the storage subsystem 100 received a packet, in the storage system of this embodiment having the above-described functions, will be described. FIG. 6 is a configuration view which described a representative element in order to illustrate an outline of a process, out of elements which configure the system of this embodiment.

Here, in this figure, packets sent in directions of arrows 001-003 are referred to as packet 001, packet 002, and packet 003, respectively. These are packets sent from the IP network 300 to the storage subsystem 100 as the iSCSI target. Out of these, the packet 001 is assumed to be the permitted iSCSI packet, and the packet 002 is assumed to be the unpermitted iSCSI packet, and the packet 003 is assumed to be the non-iSCSI packet sent from an information equipment whose source is unclear, to the storage subsystem 100.

When the storage interface 110 on the storage subsystem 100 receives the packets 001, 002, and 003, it sorts out the received packets, by the IP level filter unit 115. Here, the packet 001 and the packet 002 are judged to be the iSCSI packet, and are sent out to the LU level filter unit 116. On the other hand, the packet 003 is to be discarded, and is sent out to the communication information and failure alerting unit 118 through the traffic measuring and judging unit 117, in accordance with an arrow 004. In the traffic measuring and judging unit 117, traffic of the packet 003 per unit of time is measured, and a necessary communication ratio is calculated, and generation of the communication failure is monitored, with reference to the communication failure judging threshold table 122.

The packets 001 and 002 as the iSCSI packets sent out from the IP level filter unit 115 to the LU level filter unit 116 are judged whether they are packets which are permitted to access to the logical unit 130 in the storage subsystem 100, with reference to the LU access permission table 121 by the LU level filter unit 116.

And, the LU level filter unit 116 sends out the packet 002 to be discarded, to the communication information and failure alerting unit 118 through the traffic measuring and judging unit 117, in accordance with an arrow 005. In the traffic measuring and judging unit 117, traffic of the packet 002 per unit of time is measured, and a necessary communication ratio is calculated, and generation of the communication failure is monitored, with reference to the communication failure judging threshold table 122.

The LU level filter unit 116 judges that the packet 001 is permitted to access to the logical unit 130, and sends it out to the iSCSI off-road engine 119 through the traffic measuring and judging unit 117 in accordance with an arrow 006. In the iSCSI off-road engine 119, the SCSI command is picked up, the iSCSI command picked up is sent to the logical unit 130, and an I/O process is carried out.

In addition, in the traffic measuring and judging unit 117, traffic of the packet 001 per unit of time is measured, and a necessary communication ratio is calculated, and generation of the communication failure is monitored, with reference to the communication failure judging threshold table 122.

The communication information and failure alerting unit 118 sends communication information of the packets 002 and 003 to the communication information recording unit 156 of the maintenance terminal 150 in the storage subsystem 100, in accordance with an arrow 007 of FIG. 6. After that, the communication information recording unit 156 records the communication information of the packets 002 and 003 as the traffic log 158.

Also, the traffic measuring and judging unit 117 judges whether a communication failure is generated or not, by utilizing the communication failure judging threshold table 122.

In case that it is judged in the judgment that a communication failure is generated, in accordance with an arrow 008 of FIG. 6, through the communication information and failure alerting unit 118, information is transmitted to the warning message reporting unit 157 in the maintenance terminal 150. And in accordance with an arrow 009 of FIG. 6, the warning message reporting unit 157 which received it sends out a warning message, and thereby, that instance is reported to the management server 400.

The management server 400 which received the warning message presents information to an administrator by displaying warning messages which correspond to respective the communication failures. Also, an appropriate performance decrement preventing process in accordance with the warning message is carried out.

Hereinafter, a flow of a process which transmits a warning message to the management server 400, and a performance decrement preventing process that the management server 400 carries out in case that it received a warning message will be described.

Figure 7:
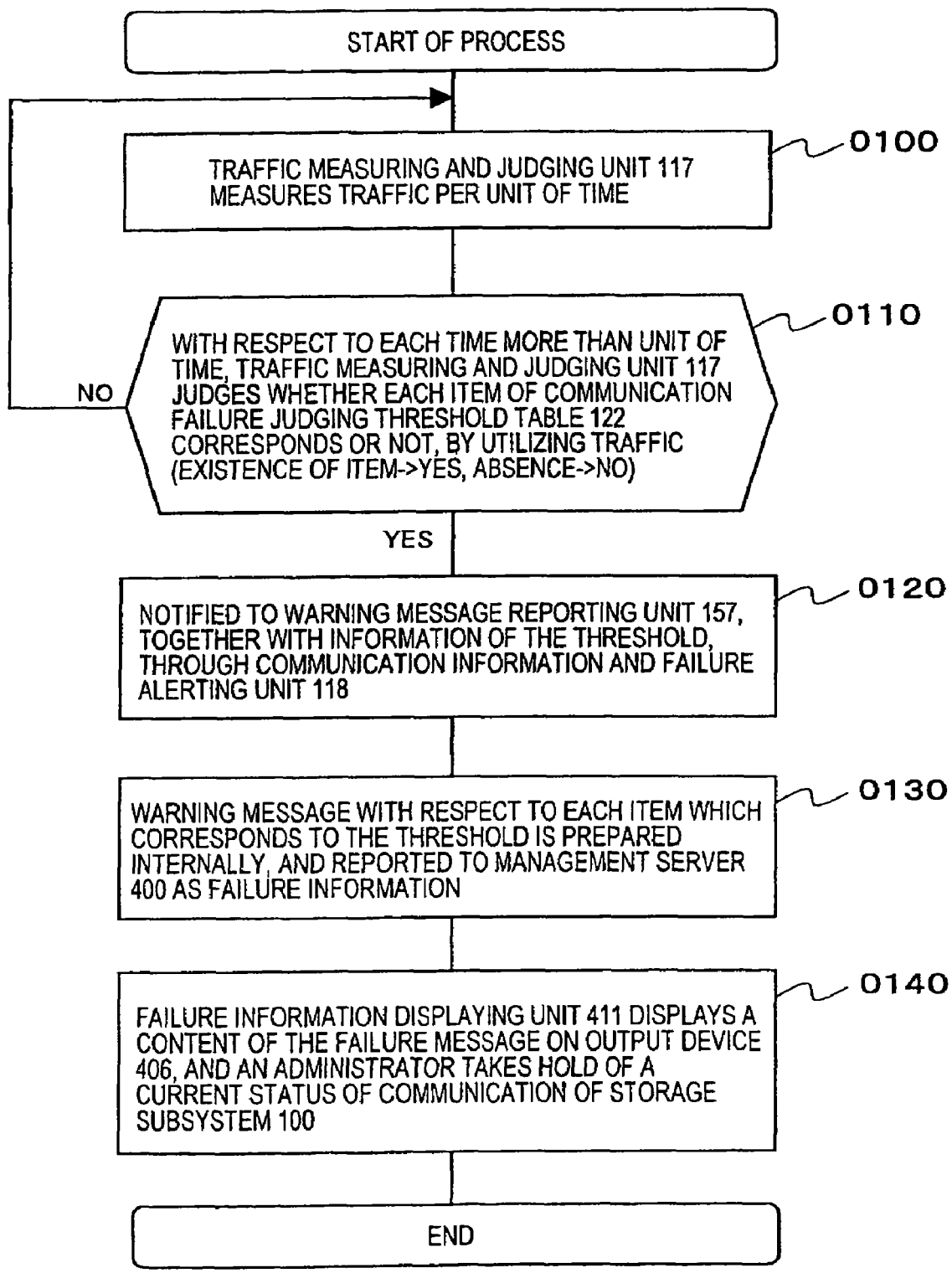
FIG. 7 is a process flow in case that an improper packet was received, in a storage system of an embodiment of the present invention.

FIG. 7 shows a process flow in the storage system of this embodiment, in case that an improper packet (unpermitted iSCSI packet, non-iSCSI packet) is received.

First, the traffic measuring and judging unit 117 measures traffic per unit of time (e.g., 1 second), with respect to a packet judged to be discarded (not sent to the logical unit 130) through the IP level filter unit 115 and/or the LU level filter unit 116, and all packets received by the storage interface 110, and with respect to each unit of time measured, calculates a predetermined communication ratio (step 0100).

Next, the traffic measuring and judging unit 117 refers to the communication failure judging threshold table 122, based on the calculated communication ratio, and judges whether it corresponds to the criteria of failure judgment or not (step 0110).

In case that there is no item corresponding to the communication failure judging threshold table 122 in the step 0110 (in case of No), a routine return to the step 0100, and a process is started again.

On the other hand, in case that there is an item corresponding to the communication failure judging threshold table 122 in the step 0110 (in case of Yes), the traffic measuring and judging unit 117 alerts a type of failure (unpermitted packet ratio, or non-iSCSi packet ratio) etc., to the warning message reporting unit 157, through the failure alerting unit 118 (step 0120).

The warning message reporting unit 157 which received the alert generates a warning message in accordance with the type of failure, and alerts it to the management server 400 as failure information (step 0130).

The management server 400 which received the warning message makes the failure information displaying unit 412 to display a content of the failure message on the output device 406, and presents it to an administrator (step 0140). An administrator confirms the content of display, and can figure out a current status of communication of the storage subsystem 100. For example, the administrator can carry out a process such as resetting of a QoS, and so on.

As described above, in case of having received the warning message, the management server 400 draws an attention of an administrator on it by displaying its content to the output device 406, and can not only accept a response of an administrator, but also carry out a performance decrement preventing process of the storage system, in accordance with a content of the received warning message, by itself.

Next, in the above-described step 0130, a performance decrement preventing process that the management server 400 carries out, in case that the received warning message means that the non-iSCSI packet ratio exceeds a threshold, or, in case that it means that the unpermitted iSCSI packet ratio exceeds the threshold, i.e., in case that accesses of improper packets are increased, will be described. Here, the performance decrement preventing process that the management server 400 carries out is to cut off a packet which causes I/O performance decrement of the storage subsystem.

In addition, in this embodiment, a case that the non-iSCSI packet ratio exceeded a threshold is an example. A process in the management server 400, which ascertains a source of improper communication by analyzing a content of the traffic log 158, which controls an IP network relay device such as the router and switch 320 etc. disposed on the IP network 300 as a transmission path to the storage subsystem 100, and which cuts off communication from a source of the improper communication will be described.

Figure 8:
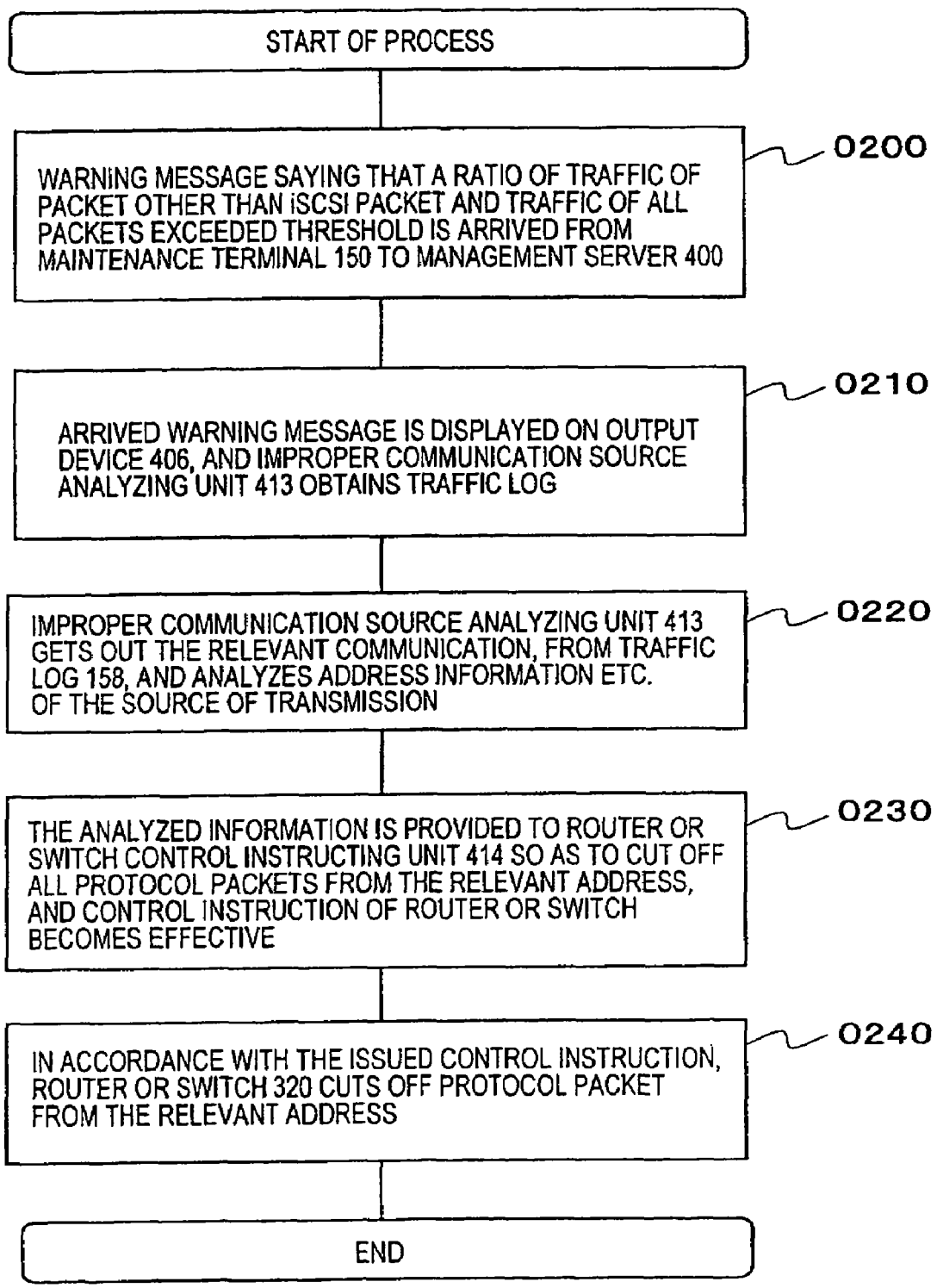
FIG. 8 is a process flow of a performance decrement preventing process in a management server of an embodiment of the present invention.

FIG. 8 shows a flow of a process which is carried out in the management server 400, in case that improper accesses are increased.

First, the management server 400 receives from the maintenance terminal 150, such a warning message that a type of failure indicates that the non-iSCSI packet ratio exceeded a threshold (step 0200).

The management server 400 which received the warning message, makes the failure information displaying unit 412 to appear a display which is corresponding to the warning message received in the step 0200 on the output device 406, and makes the improper communication source analyzing unit 413 to obtain the traffic log 158 recorded in the maintenance terminal 150 (step 0210).

The improper communication source analyzing unit 413 analyzes the corresponding traffic log, by using information of the obtained traffic log 158, and searches address information etc. of a source of transmitting an improper packet (step 0220).

The improper communication source analyzing unit 413, in order to carry out a process which cuts off all of packets from the corresponding address 1583 (e.g., in case of an example of FIG. 5, 10.X.X.X), issues a control instruction of the router or switch meaning that communication from the corresponding address 1583 is cut off, to the router or switch control instructing unit 414 (step 0230).

The router or switch control instructing unit 414, in accordance with the control instruction issued in the step 0230, controls the router or switch 320 to cut off a packet from the corresponding address (step 0240).

The storage system of this embodiment can cut off a communication attack which targets the storage subsystem 100 for an attack, by carrying out the process as described above.

Next, a process in case that the received warning message means that a ratio of traffic of the iSCSI packet which accesses to the logical unit 130 normally is reduced, in the above-described step 0130, i.e., in case that the permitted iSCSI packet ratio become a threshold or below, will be hereinafter described.

Here, the performance decrement preventing process that the management server 400 carries out is to secure a necessary QoS in the permitted iSCSI packet, based on an instruction regarding QoS control of an IP network designated in advance by an administrator. The management server 400 controls an IP network relay equipment such as the router or switch 320 etc. disposed on the IP network 300 as a transmission path to the storage subsystem 100, and secures a necessary QoS to access from the host computer 200 which has a right to access to the storage subsystem 100.

Figure 9:
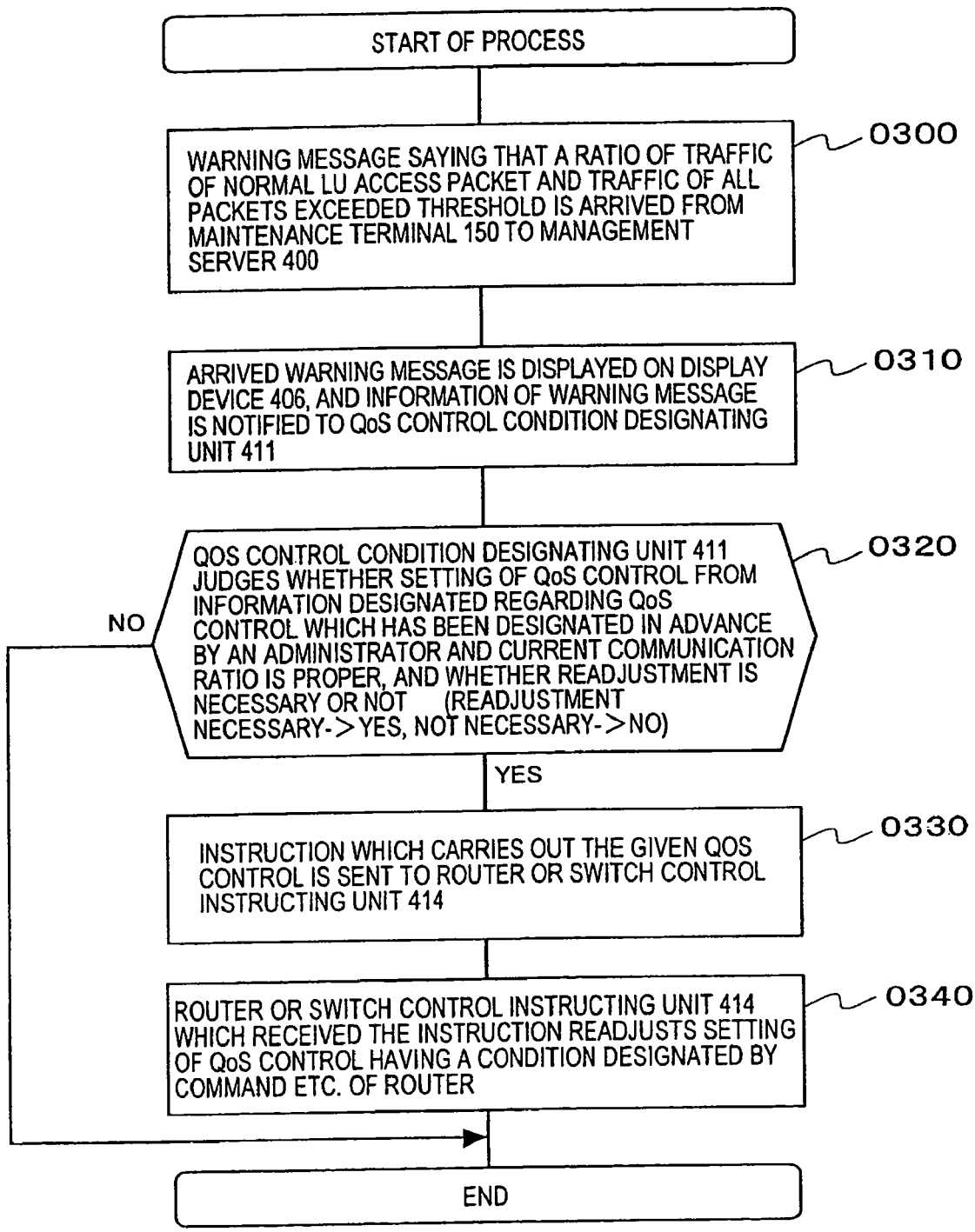
FIG. 9 is a process flow of a QoS control process in the management server of an embodiment of the present invention.

FIG. 9 shows a flow of a process which is carried out in the management server 400, in case that the permitted iSCSI packet ratio becomes a threshold or below.

First, the management server 400 receives a warning message which indicates that the permitted iSCSI packet ratio becomes a threshold or below, from the maintenance terminal 150 (step 0300).

The management server 400 which received the warning message makes the failure information displaying unit 412 to appear a display which corresponded to a content of the received message on the display device 406, and alerts information included in the warning message to the QoS control condition designating unit 411 (step 0310).

The QoS control condition designating unit 411 compares a value stored in the threshold storing column 122b of the communication failure judging threshold table 122 with a value of a communication ratio received by the warning message, and judges whether setting of QoS control is proper or not, i.e., whether readjustment is necessary (step 0320).

In case that it is judged in the judgment of the step 0320 that readjustment of QoS control is necessary (in case of Yes), an instruction, which is necessary for carrying out the given QoS control, is sent to the router or switch control instructing unit 414 (step 0330).

On the other hand, in case that it is judged that the readjustment is not necessary (in case of No), the process is concluded.

The router or switch control instructing unit 414 which received the instruction in the step 0330 readjusts setting of QoS control as a condition designated by a command etc. of a router (step 0340), and concludes the process.

It is possible for the storage system of this embodiment to dynamically readjust setting of QoS to the storage subsystem 100, in accordance with a status of communication, by carrying out the process as described above.

In this manner, according to this embodiment, the storage system can sort a packet which is accessible to the logical unit 130 (normal packet) and a packet other than it (improper packet), in the storage subsystem 100.

In this embodiment, this sorting is realized by two filters of an IP level filter (first filter) which searches only an iSCSI packet, and an LU level filter (second filter) which searches only a packet permitted to access to a storage subsystem from among the iSCSI packets. Furthermore, judgment of accessibility in the LU level filter is carried out at the time when a session is built up, i.e., by only an iSCSI packet transmitted at the time of iSCSI log-in. And, after a session is built up by the above-stated packet, accessibility of individual packets is not judged. On this account, accessibility can be judged effectively.

Also, since a traffic log of an improper packet is recorded, by using the suchlike information, it is possible to take a procedure to cut off future receptions.

Furthermore, since traffic is monitored with respect to each sorted type, with regard to all packets, by using the suchlike information, it is also possible to secure an appropriate QoS for communication of a normal packet.

What is claimed is:

1. A storage subsystem which is connected to a host computer through a communication line, comprising
an interface which is used for connecting to said communication line, wherein,
said interface comprises a first filter which judges, on the occasion of having received communication packets from said communication line, whether there is a communication packet with a predetermined format for use in an access to said storage subsystem, among the communication packets;
wherein said interface further comprises:
a second filter which receives the communication packet judged to be for access to said storage subsystem in said first filter, and judges whether the received communication packet is permitted access to a storage area in said storage subsystem and is transmitted from said host computer,
a traffic measuring and judging unit which measures:
traffic of all communication packets received in the interface,
traffic of a communication packet judged not to be the packet with said predetermined format in said first filter, and
traffic of a communication packet judged not to be transmitted from said host computer in said second filter,
wherein said traffic measuring and judging unit uses the three measured traffics to judge whether a communication failure is generated, and
a communication failure alerting unit which alerts a management server connected to said storage subsystem, wherein the management server comprises a function of displaying information alerted, in case that it is judged that a communication failure is generated in said traffic measuring and judging unit,
wherein:
in case that said host computer is permitted to access said storage subsystem, said interface further comprises an access permission table having information which uniquely specifies the host computer, a virtual storage area identification which the host computer arbitrarily assigns to a storage area in said storage subsystem, and an actual storage area identification which corresponds to said virtual storage area identification and which uniquely specifies a storage area in said storage subsystem, said storage area being permitted access by the host computer, and
said second filter judges whether the received communication packet is permitted to access said storage area and is transmitted from the host computer in accordance with information stored in said access permission table.

2. The storage subsystem according to claim 1, wherein said interface further comprises a traffic log recording unit which records, as a traffic log, communication information of a communication packet judged not to be the communication packet with said predetermined format in said first filter and a communication packet judged not to be the communication packet transmitted from said host computer and judged not to be permitted to access to said storage area in said second filter.

3. A management server connected to the storage subsystem according to claim 2, further comprising,
an improper communication source analyzing unit which refers to said traffic log, in case that the improper communication source analyzing unit is alerted from said communication failure alerting unit of said storage subsystem that a communication failure is generated, and searches a source of said communication packet that causes the communication failure.

4. The management server according to claim 3, further comprising,
a relay device control unit which controls, based on information of a source searched in said improper communication source analyzing unit, a relay device which relays communication to said storage subsystem disposed on said communication line so as to cut off communication from the source.

5. The storage subsystem according to claim 1, wherein a header of the communication packet with the predetermined format includes information which shows that an iSCSI command is encapsulated in the communication packet.

6. A storage system in which a storage subsystem, a host computer, and a management server are connected by a communication line, wherein,
said storage subsystem comprises an interface which connects to said communication line, and
said interface comprises:
a first filter which judges, on the occasion of having received communication packets from said communication line, whether there is a communication packet with a predetermined format for use in an access to said storage subsystem, among the communication packets,
a second filter which receives the communication packet judged to be for access to said storage subsystem in said first filter, and judges whether the received communication packet is permitted access to a storage area in said storage subsystem and is transmitted from said host computer,
a traffic measuring and judging unit which measures traffic of all communication packets received in the interface, traffic of a communication packet judged not to be the packet with said predetermined format in said first filter, and traffic of a communication packet judged not to be transmitted from said host computer in said second filter, wherein said traffic measuring and judging unit uses the three measured traffics to judge whether a communication failure is generated,
a communication failure alerting unit which alerts said management server, in case that it is judged that a communication failure is generated in said traffic measuring and judging unit, and a traffic log recording unit which records, as a traffic log, communication information of a communication packet judged not to be the communication packet with said format in said first filter and a communication packet judged not to be the communication packet transmitted from said host computer permitted to access in the second filter, and said management server comprises:

a display device which displays the alert received from said communication failure alerting unit, an improper communication source analyzing unit which refers to said traffic log, in case that the improper communication source analyzing unit is alerted from said communication failure alerting unit of said storage subsystem that a communication failure is generated, and searches a source of said communication packet which causes the communication failure, and a relay device control unit which controls, based on information of a source searched in said improper communication source analyzing unit, a relay device which relays communication to said storage subsystem disposed on said communication line so as to cut off communication from the source, wherein:

in case that said host computer is permitted to access said storage subsystem, said interface further comprises an access permission table having information which uniquely specifies the host computer, and information which specifies a storage area in said storage subsystem to which the host computer is permitted to access, and said second filter judges whether the received communication packet is permitted to access said storage area and is transmitted from the host computer in accordance with information stored in said access permission table.

7. The storage system according to claim 6, wherein, said traffic measuring and judging unit further measures traffic of a communication packet judged to be the communication packet transmitted from said host computer permitted to access in said second filter, and by using the traffic and said traffic of all communication packets, judges whether a value of a ratio of traffic of a communication packet transmitted from said host computer permitted to access to traffic of all communication packets is less than a predetermined value or not, and said communication failure alerting unit alerts said management server of the alert which indicates that second communication failure is generated, in case that it is judged that the value of the ratio is less than the predetermined value in the traffic measuring and judging unit, and said management server further comprises a QoS condition designating unit which, in case of having received the alert which indicates that the second communication failure is generated from said communication failure alerting unit, readjusts a network QoS between said storage subsystem and said host computer, which has been set up in advance by an administrator.

8. The storage system according to claim 7, wherein a header of the communication packet with the predetermined format includes information which shows that an iSCSI command is encapsulated in the communication packet.

* * * * *

UNITED STATES PATENT AND TRADEMARK OFFICE
CERTIFICATE OF CORRECTION

PATENT NO. : 7,757,279 B2 Page 1 of 1
APPLICATION NO. : 12/181287
DATED : July 13, 2010
INVENTOR(S) : Hiroshi Furukawa et al.

It is certified that error appears in the above-identified patent and that said Letters Patent is hereby corrected as shown below:

Title Page:

Please add:

In section (75) as indicated below:

"Esutaro Akagawa"

should read,

--Etsutaro Akagawa--

--(30) Foreign Application Priority Data,
November 19, 2003 (JP)..............2003-389475--

--(63) Related U.S. Application Data
Continuation of application No. 10/791,542, filed on March 01, 2004, now Pat. No. 7,431,989.--

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,757,279 B2
APPLICATION NO. : 12/181287
DATED : July 13, 2010
INVENTOR(S) : Hiroshi Furukawa et al.

Page 1 of 1

It is certified that error appears in the above-identified patent and that said Letters Patent is hereby corrected as shown below:

Title Page:

Please add:

In section (75) as indicated below:

"Esutaro Akagawa"

should read,

--Etsutaro Akagawa--

--(30) Foreign Application Priority Data,
November 19, 2003 (JP)..............2003-389475--

--(63) Related U.S. Application Data
Continuation of application No. 10/791, 542, filed on March 01, 2004, now abandoned.--

This certificate supersedes the Certificate of Correction issued November 30, 2010.

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

PATENT NO.        : 7,757,279 B2                                           Page 1 of 1
APPLICATION NO.   : 12/181287
DATED             : July 13, 2010
INVENTOR(S)       : Hiroshi Furukawa et al.

It is certified that error appears in the above-identified patent and that said Letters Patent is hereby corrected as shown below:

Title Page:

Please add:

In section (75) as indicated below:

"Esutaro Akagawa"

should read,

--Etsutaro Akagawa--

--(30) Foreign Application Priority Data,
November 19, 2003 (JP)..............2003-389475--

--(63) Related U.S. Application Data
Continuation of application No. 10/791,452, filed on March 01, 2004, now abandoned.--

This certificate supersedes the Certificates of Correction issued November 30, 2010 and February 15, 2011.

Signed and Sealed this
Thirty-first Day of July, 2012

David J. Kappos
*Director of the United States Patent and Trademark Office*